US012640914B2

(12) United States Patent
Coventry, III

(10) Patent No.: US 12,640,914 B2
(45) Date of Patent: May 26, 2026

(54) METHOD AND SYSTEM FOR A QUANTUM-ENHANCED DECRYPTION PROCESS FOR RSA AND AES ENCRYPTIONS

(71) Applicant: Cambridge Weaponry, San Francisco, CA (US)

(72) Inventor: Robert Coventry, III, Diamond Bar, CA (US)

(*) Notice: Subject to any disclaimer, the term of this patent is extended or adjusted under 35 U.S.C. 154(b) by 0 days.

(21) Appl. No.: 18/514,253

(22) Filed: Nov. 20, 2023

(65) Prior Publication Data

US 2024/0340169 A1     Oct. 10, 2024

Related U.S. Application Data

(60) Provisional application No. 63/458,168, filed on Apr. 10, 2023.

(51) Int. Cl.
| | |
|---|---|
| *H04L 29/06* | (2006.01) |
| *H04L 9/06* | (2006.01) |
| *H04L 9/08* | (2006.01) |
| *H04L 9/30* | (2006.01) |

(52) U.S. Cl.
CPC .......... *H04L 9/0852* (2013.01); *H04L 9/0631* (2013.01); *H04L 9/302* (2013.01)

(58) Field of Classification Search
CPC ...... H04L 9/0852; H04L 9/302; H04L 9/0631
See application file for complete search history.

(56) References Cited

U.S. PATENT DOCUMENTS

| | | | | |
|---|---|---|---|---|
| 11,240,223 | B1 * | 2/2022 | Stapleton | ................ G06F 21/72 |
| 2018/0196780 | A1 * | 7/2018 | Amin | .................. G06F 9/30145 |

| | | | | |
|---|---|---|---|---|
| 2021/0111898 | A1 * | 4/2021 | McCarty | ............. H04L 63/0853 |
| 2023/0244988 | A1 * | 8/2023 | Rane | .................... G06N 3/0455 |
| | | | | 706/12 |
| 2023/0281604 | A1 * | 9/2023 | Robell | ................. G06Q 30/018 |
| 2023/0385682 | A1 * | 11/2023 | Rastunkov | ............. G06N 10/80 |
| 2023/0388871 | A1 * | 11/2023 | Guo | ................. H04W 36/0069 |
| 2024/0089092 | A1 * | 3/2024 | Septon | .................. H04B 10/25 |
| 2024/0089094 | A1 * | 3/2024 | Mateo Rodriguez | ........................ |
| | | | | H04L 9/0858 |
| 2024/0171289 | A1 * | 5/2024 | Becker | .................... H01P 3/003 |

OTHER PUBLICATIONS

"Nimbe et al., Implementation of Framework for Quantum-Classical and Classical-Quantum Conversion, Feb. 17, 2022, Springer, vol. 61, article 37, pp. 793-818" (Year: 2022).*

* cited by examiner

*Primary Examiner* — Dao Q Ho

(74) *Attorney, Agent, or Firm* — The Rapacke Law Group, P.A.

(57)     ABSTRACT

The embodiments provided herein disclose a method and system for a quantum-enhanced decryption process for RSA and AES encryptions. The system includes a quantum computing module with one or more processors configured to execute quantum algorithms. A classical computing module is provided for post-processing decrypted data and a data conversion module facilitates data format translation between quantum and classical modules. An interface module is provided for user interaction with an integrated software to optimize the system for performance, security, and resource efficiency. The system is further capable of decrypting RSA and AES encrypted data, along with quantum-vulnerable encryption standards found in both real-time and archived data sources.

15 Claims, 2 Drawing Sheets

COMPUTING SYSTEM 200

APPLICATION PROGRAM 210

COMMUNICATION MODULE 202

DATABASE ENGINE 204

INTERFACE MODULE 216

QUANTUM COMPUTING MODULE 220

CLASSICAL COMPUTING MODULE 222

DATA CONVERSION MODULE 224

METHOD AND SYSTEM FOR A QUANTUM-ENHANCED DECRYPTION PROCESS FOR RSA AND AES ENCRYPTIONS

TECHNICAL FIELD

The embodiments disclosed herein relate to systems and methods for quantum-enhanced decryption processes in prospective software applications.

BACKGROUND

Quantum computing has grown in popularity and usefulness in recent years. However, the prohibitive cost of quantum computing software has inhibited development in the industry. Ribest-Shamir-Adleman (RSA) encryption and Advanced Encryption Standard (AES) encryption are common cryptographic techniques used but may not have quantum-safe algorithms.

Current techniques being develop focus on intercepting the data during the processes of transmission between each party. Although data may be encrypted while in transmission, for example, it certainly remains vulnerable as it is being written, displayed or implemented by a third party elsewhere.

In terms of decrypting RSA and AES algorithms, existing methodologies have failed in decryption. The only known "successful attack" on AES, for example, relied on the idea that more information could be gleaned from an unsecured software application, which, of course, is dependent not on the algorithm, but the software itself.

SUMMARY OF THE INVENTION

This summary is provided to introduce a variety of concepts in a simplified form that is disclosed further in the detailed description of the embodiments. This summary is not intended for determining or limiting the scope of the claimed subject matter.

The embodiments provided herein disclose a method and system for a quantum-enhanced decryption process for RSA and AES encryptions. The system includes a quantum computing module with one or more processors configured to execute quantum algorithms. A classical computing module is provided for post-processing decrypted data and a data conversion module facilitates data format translation between quantum and classical modules. An interface module is provided for user interaction with an integrated software to optimize the system for performance, security, and resource efficiency. The system is further capable of decrypting RSA and AES encrypted data, along with quantum-vulnerable encryption standards found in both real-time and archived data sources.

A method for quantum-enhanced decryption for RSA and AES encryptions is also disclosed. The method includes first, developing a quantum computing module to implement one or more quantum algorithms. A classical computing module is designed to perform one or more post-processing steps. A data conversion module is implemented to translate an output provided by the quantum computing module into a compatible format capable of being utilized by the classical computing module. An interface module is created to permit a user to interact with a software application, wherein the interface module provides one or more inputs and receives one or more outputs. Each module is integrated with the software application which is optimized for one or more performance metrics, one or more security metrics, and one or more resource metrics.

The systems and methods include a clear path for decrypting RSA and AES data while being difficult to implement. Difficulty in implementing the system and method ensure that the technology is unlikely to be tested by adversaries. Its design and implementation when in use is difficult to counter, meaning that once data is captured, this method would not permit its further security by a sender or receiver.

Other objects and advantages of the various embodiments of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

DETAILED DESCRIPTION

Figure 1:
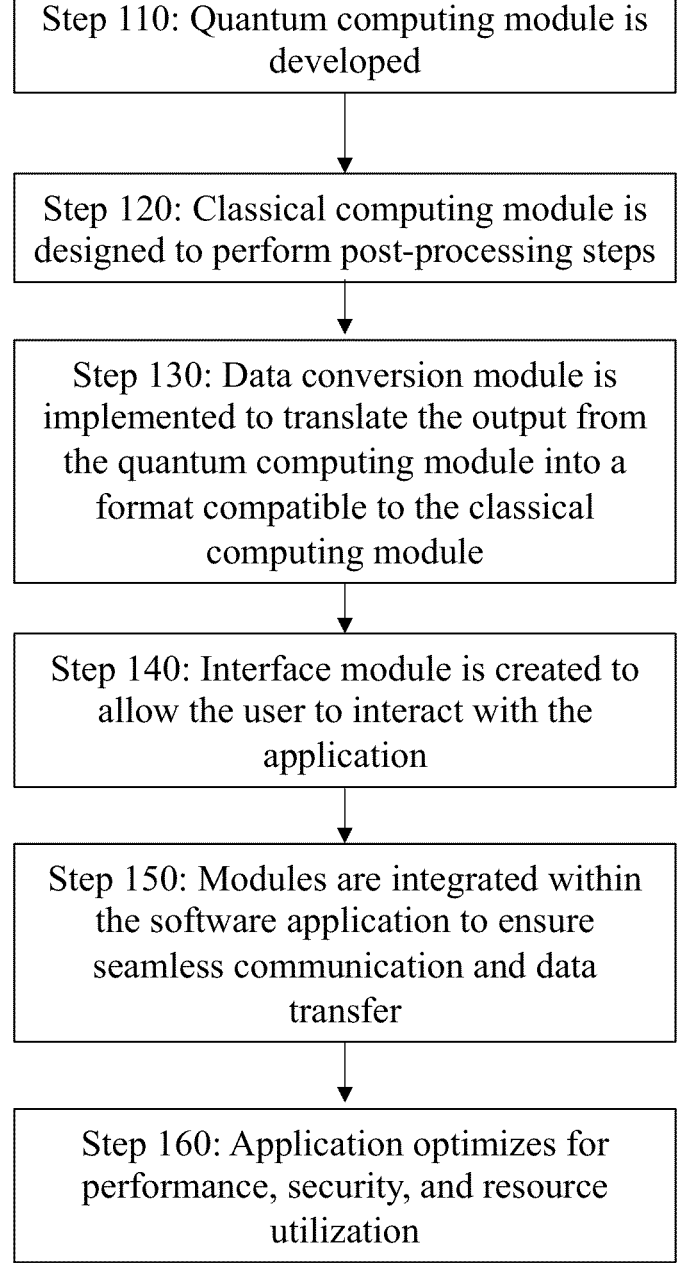
FIG. 1 illustrates a flowchart of a method for a quantum-enhanced decryption process for RSA and AES encryptions, according to some embodiments.

The specific details of the single embodiment or variety of embodiments described herein are set forth in this application. Any specific details of the embodiments described herein are used for demonstration purposes only, and no unnecessary limitation(s) or inference(s) are to be understood or imputed therefrom.

Before describing in detail exemplary embodiments, it is noted that the embodiments reside primarily in combinations of components related to particular devices and systems. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments provided herein relate to a system and method for embedding the quantum decryption process for RSA and AES encryption within a software application using a modular architecture. The system facilitates seamless interaction between the quantum algorithms and classical post-processing steps. Without the need for a quantum computer, the system incorporates a set of quantum algorithms, including Shor's algorithm, Lenstra elliptic-curve factorization Grover's algorithm, and a quantum version of ECM with Edwards curves (GEECM) which are designed to exploit the superposition and entanglement properties of qubits. The use of quantum algorithms in the system enables rapid factorization of large integers and efficient searching for cryptographic keys. The system also performs various other functions described below.

In some embodiments, the system performs the post-processing steps, including classical error correction and privacy amplification using standard programming languages and libraries, such as Python or C++.

In some embodiments, the system implements a data conversion module that translates the output from the quantum computing module into a format compatible with the classical computing module. This may involve converting qubit measurement results into classical bit strings or other data structures, as required by the classical error correction and privacy amplification techniques.

In some embodiments, the system creates an interface module that allows the user to interact with the software application, providing input (encrypted data and decryption parameters) and receiving output (decrypted data and relevant information, such as the cryptographic key). This interface can be designed as a graphical user interface (GUI), command-line interface (CLI), or application programming interface (API), depending on the intended use and target audience.

In some embodiments, the system integrates all modules within the software application, ensuring seamless communication and data transfer between the quantum and classical components. This may involve designing appropriate data structures, communication protocols, and error handling mechanisms to manage the interaction between the quantum and classical modules.

In some embodiments, the system optimizes the software application for performance, security, and resource utilization by fine-tuning the quantum algorithms, classical post-processing techniques, and integration methods. This may involve selecting appropriate quantum computing hardware, optimizing the choice of error correction codes, and implementing privacy amplification techniques that maximize security while minimizing computational overhead.

In some embodiments, the system allows for a post-processing phase that involves classical error correction and privacy amplification to ensure the security and accuracy of decrypted information, striking a balance between efficiency and data protection.

In some embodiments, the system is operable to perform a method that contributes to the ongoing advancements in cryptography and quantum computing while maintaining the security and accuracy of sensitive data and ensures compatibility with both existing and future quantum computing hardware.

In essence, the patent proposed is for a potential software application which allows government or private entities to decode RSA or AES encrypted data utilizing quantum computing. This means that an agent, with a classical computer, would connect to a quantum computer for a decoding, and then receive that decoding on the classical computer.

Data capture programs, according to some leading technologists, believe that the US government has captured vast swaths of RSA and AES encrypted data. This patent's primary use would be to permit human-computer decryption of that data in an efficient and clear manner.

The detailed patent application summary presents the algorithms and their capabilities to decode, as well as the potential use of such a proposed software application in relation to the government.

An alternative or additional method to this invention would be to create a software application using a classical supercomputer capable of breaking the RSA or AES encryptions.

The method and its application itself, applied to a software application, are unique, but the exceptionally unique aspect of the application is the classical and quantum communication process and the post-processing privacy protection.

FIG. 1 illustrates a flowchart of a method 100 for a quantum-enhanced decryption process for RSA and AES encryptions. In step 110, a quantum computing module is developed which implements the quantum algorithms (Shor's, Lenstra elliptic-curve factorization, Grover's, and GEECM) using a quantum computing library or framework, such as Qiskit or Cirq. This module will handle the execution of the quantum algorithms on a quantum processor or a quantum simulator. In step 120, a classical computing module is designed that performs the post-processing steps, including classical error correction and privacy amplification. This module can be developed using standard programming languages and libraries, such as Python or C++.

As used herein, the term quantum computing library may be used to indicate a library which provides a suite of tools for implementing algorithms including but not limited to Shor's algorithm for integer factorization, Grover's algorithm for database search, and custom quantum circuits tailored for specific encryption schemas, all configured for execution on a variety of quantum processing units.

Quantum computing framework may describe the one or more quantum algorithms are developed using a quantum computing framework, which facilitates the design, simulation, actualization, implementation and testing of quantum circuits, supporting error correction protocols, and quantum logic gates customization, ensuring adaptability to various quantum software and hardware architectures.

In step 130, a data conversion module is implemented which translates the output from the quantum computing module into a format compatible with the classical computing module. This step may involve converting qubit measurement results into classical bit strings or other data structures, as required by the classical error correction and privacy amplification techniques. In step 140, an interface module is created which allows the user to interact with the software application, providing input (encrypted data and decryption parameters) and receiving output (decrypted data and relevant information, such as the cryptographic key). This interface can be designed as a graphical user interface (GUI), command-line interface (CLI), or application programming interface (API), depending on the intended use and target audience.

In step 150, each module is integrated within the software application to ensure seamless communication and data transfer between the quantum and classical components. This may involve designing appropriate data structures, communication protocols, and error handling mechanisms to manage the interaction between the quantum and classical modules. In step 160, the software application optimizes for performance, security, and resource utilization by fine-tuning the quantum algorithms, classical post-processing techniques, and integration methods. This step may involve selecting appropriate quantum computing hardware, optimizing the choice of error correction codes, and implementing privacy amplification techniques that maximize security while minimizing computational overhead.

By following this modular integration approach, the quantum-enhanced decryption process can be seamlessly incorporated into prospective software applications, providing end-users with efficient and secure RSA and AES decryption capabilities. This integration method ensures compatibility with both existing and future quantum computing hardware, as well as adaptability to advancements in quantum algorithms and classical post-processing techniques.

In some embodiments, the one or more inputs is one or more decryption parameters, including but not limited to specific data queries or structures, tracked structures or communications, protocol mediums, cryptographic protocols, key lengths, padding schemes, and protocol versions, selected based on the encryption standard used and the security or decryption requirements specified by the user or application.

In some embodiments, the software application is optimized using fine-tuning of the quantum algorithms, including but not limited to the Shor's algorithm and Grover's algorithm, as well as the process of adjusting quantum gate parameters, optimizing qubit allocation and layout for minimal quantum state decoherence, and implementing adaptive quantum circuit designs based on real-time performance metrics.

Figure 2:
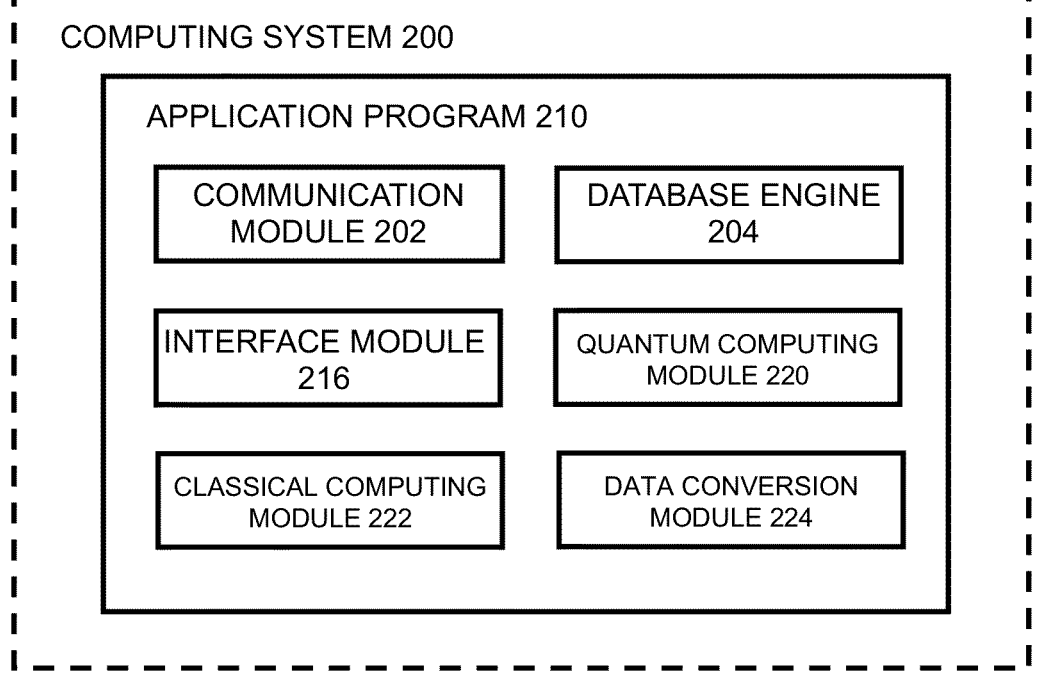
FIG. 2 illustrates a block diagram of the system components, according to some embodiments.

FIG. 2 illustrates an example computer architecture for the application program 210 operated via the computing system 200. The computer system 200 comprises several modules and engines configured to execute the functionalities of the application program 210, and a database engine 204 configured to facilitate how data is stored and managed in one or more databases. In particular, FIG. 2 is a block diagram showing the modules and engines needed to perform specific tasks within the application program 210.

Referring to FIG. 2, the computing system 200 operating the application program 210 comprises one or more modules having the necessary routines and data structures for performing specific tasks, and one or more engines configured to determine how the platform manages and manipulates data. In some embodiments, the application program 210 comprises one or more of a communication module 202, a database engine 204, a user module 212, an interface module 216, a quantum computing module 220, a classical computing module 222, and a data conversion module 224.

In some embodiments, the communication module 202 is configured for receiving, processing, and transmitting a user command and/or one or more data streams. In such embodiments, the communication module 202 performs communication functions between various devices, including the user computing device. In some embodiments, the communication module 202 is configured to allow one or more users of the system, including a third-party, to communicate with one another. In some embodiments, the communications module 202 is configured to maintain one or more communication sessions with one or more servers, the administrative computing device, and/or one or more third-party computing device(s). In some embodiments, the communication module 202 allows each user to transmit and receive information which may be used by the system.

In some embodiments, a database engine 204 is configured to facilitate the storage, management, and retrieval of data to and from one or more storage mediums, such as the one or more internal databases described herein. In some embodiments, the database engine 204 is coupled to an external storage system. In some embodiments, the database engine 204 is configured to apply changes to one or more databases. In some embodiments, the database engine 204 comprises a search engine component for searching through thousands of data sources stored in different locations. The database engine 204 allows each user and module associated with the system to transmit and receive information stored in various databases.

In some embodiments, the interface module 216 is configured to display one or more graphic user interfaces, etc.

In some embodiments, the interface module 216 is configured to temporarily generate and display various pieces of information in response to one or more commands or operations. The various pieces of information or data generated and displayed may be transiently generated and displayed, and the displayed content in the interface module 216 may be refreshed and replaced with different content upon the receipt of different commands or operations in some embodiments. In such embodiments, the various pieces of information generated and displayed in an interface module 216 may not be persistently stored.

In some embodiments, the quantum computing module 220 is configured to scale dynamically based on the volume of encrypted data being processed. This supports high-throughput decryption tasks consistent with real-time analysis of large-scale data streams. The quantum computing module 220 is enabled with configurability for existing and future cryptographic, data visualization, data analytics and programming systems, and supports standard data interface formats and protocols of such systems.

In some embodiments, the quantum computing module 200 executes a quantum algorithm which may be capable of analyzing and decrypting cryptographic functions utilized in blockchain technology. This process then enables the efficient and effective verification or reconstruction of the pre-hash input values and the ability to analyze, decrypt, disrupt, or provide insights for blockchain systems, potentially applicable in scenarios requiring the audit, recovery or disruption of blockchain technologies.

In some embodiments, the classical computing module 222 is operable perform one or more post-processing steps including implementing a data conversion module to translate an output provided by the quantum computing module into a compatible format capable of being utilized by the classical computing module.

In some embodiments, the data conversion module 224 is operable to translate an output provided by the quantum computing module into a compatible format capable of being utilized by the classical computing module.

In some embodiments, the software application and its modules are optimized using classical and quantum post-processing techniques, including but not limited to the dynamic allocation of computational resources for error correction, application of machine learning algorithms to predict and preemptively address decryption errors, the application of artificial intelligence including but not limited to machine learning and transformer based models, and the use of multi-threading to efficiently manage simultaneous tasks.

In some embodiments, the software application is optimized using one or more integration methods designed to ensure compatibility and enhance performance across diverse computing platforms; said techniques including, but not limited to, a modular software architecture for facile updates and enhancements to quantum algorithms, the integration of quantum and classical processors, the cross-environment functionality for seamless operation with various classical computing infrastructures, the implementation of real-time decryption and database-oriented structures, and the deployment of extensible APIs enabling robust data exchange and interoperation between quantum computing systems and traditional data analysis platforms.

In some embodiments, the software application and its modules are configured for interoperability with existing data analysis platforms by supporting standard data interchange formats and protocols used in such systems, including the use of mechanisms to ensure compliance with data privacy regulations.

In some embodiments, the one or more quantum algorithms are configurable to decrypt a plurality of encryption standards, such cryptographic protocols that are based on factoring large integers, discrete logarithms, or other mathematically complex operations known to be susceptible to quantum computing methods, including but not limited to RSA, AES, and other cryptographic protocols encountered in repositories of data.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety to the extent allowed by applicable law and regulations. The systems and methods described herein may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The foregoing is provided for purposes of illustrating, explaining, and describing embodiments of this disclosure. Modifications and adaptations to these embodiments will be apparent to those skilled in the art and may be made without departing from the scope or spirit of this disclosure.

As used herein and in the appended claims, the singular forms "a", "an", and "the" include plural referents unless the context clearly dictates otherwise.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described herein. A variety of modifications and variations are possible in light of the above teachings without departing from the following claims.

What is claimed is:

1. A method for quantum-enhanced decryption for RSA and AES encryptions, the method comprising the steps of:

developing a quantum computing module to implement one or more quantum algorithms comprising at least one of Shor's algorithm, a Lenstra elliptic-curve factorization Grover's algorithm, or a quantum version of ECM with Edwards curves (GEECM), wherein the quantum computing module is configured to specifically target decryption of RSA and AES encrypted data through modular allocation of quantum gate parameters, adaptive quantum circuit layouts based on real-time performance metrics, and integrated mid-circuit measurement-based conditional branching for performance tuning;

designing a classical computing module to perform one or more post-processing steps comprising cryptographic key reconstruction based on outputs received from the quantum computing module, wherein the post-processing further comprises classical error correction and privacy amplification techniques to maintain data integrity and confidentiality across quantum-classical interfaces, and supports dynamic adjustment of quantum-classical fidelity thresholds;

implementing a data conversion module to translate an output provided by the quantum computing module into a compatible format capable of being utilized by the classical computing module, the translation including conversion of qubit measurement results into classical bit strings or structured data suitable for subsequent cryptographic analysis, along with integrity verification metadata;

creating an interface module to permit a user to interact with a software application, wherein the interface module provides one or more inputs comprising encrypted data and receives one or more outputs;

integrating each of the quantum computing module, the classical computing module, the data conversion module, and the interface module with the software application; and optimizing the software application for one or more performance metrics, one or more security metrics, and one or more resource metrics, including adaptive machine learning models that predict and preemptively address decryption errors, dynamic load balancing between quantum and classical resources, and compliance with data privacy regulations during decryption of large-scale RSA and AES data streams.

2. The method of claim 1, wherein the one or more quantum algorithms are developed using a quantum computing library comprising at least one of Qiskit, Cirq, or other quantum software toolkits.

3. The method of claim 1, wherein the one or more quantum algorithms are developed using a quantum computing framework, which facilitates the design, simulation, actualization, implementation and testing of quantum circuits, supporting error correction protocols, and quantum logic gates customization, ensuring adaptability to various quantum software and hardware architectures including superconducting qubits, trapped ions, or photonic quantum processors.

4. The method of claim 1, wherein the one or more post-processing steps includes a classical error correction step, and security or privacy amplification steps, configured to maintain data integrity and confidentiality across quantum-classical interfaces; said steps comprising, but not limited to, dynamic role-based access controls, comprehensive audit trails, secure management of boot processes, and end-to-end encryption protocols adaptable to both quantum-resilient and classical encryption standards; the method further comprising utilizing a distributed architecture for scalable processing, data redundancy, and resilience; the employing of algorithmic, machine learning or artificial intelligence techniques to adaptively manage security protocols in real-time or through predictive methodologies, and employing parallel processing techniques for efficient data flow management, while systematically verifying the integrity and security of the data throughout the process.

5. The method of claim 1, wherein the one or more inputs is one or more decryption parameters, including but not limited to specific data queries or structures, tracked structures or communications, protocol mediums, cryptographic protocols, key lengths, padding schemes, and protocol versions, wherein the decryption parameters are dynamically selected based on the encryption standard used and the security or decryption requirements specified by the user or application, ensuring compatibility with RSA, AES, and other quantum-vulnerable encryption standards.

6. The method of claim 1, wherein the one or more outputs includes a plurality of decrypted data.

7. The method of claim 1, wherein the interface module provides a graphical user interface.

8. The method of claim 1, wherein the interface module provides a command-line interface.

9. The method of claim 1, wherein the interface module provides an application programming interface.

10. The method of claim 1, wherein the software application is optimized using fine-tuning of the quantum algorithms as well as the process of adjusting gate parameters, optimizing qubit allocation and layout for minimal quantum state decoherence, and implementing adaptive quantum circuit designs based on real-time performance metrics.

11. The method of claim 1, wherein the software application and its modules are optimized using classical and quantum post-processing techniques, including but not limited to the dynamic allocation of computational resources for error correction, application of machine learning algorithms to predict and preemptively address decryption errors, integration of artificial intelligence techniques comprising machine learning models and transformer-based architectures for enhanced key recovery and cryptographic analysis, adaptive error correction mechanisms tailored to quantum noise characteristics, and the use of multithreading to efficiently manage simultaneous decryption tasks across quantum and classical computing environments.

12. The method of claim 1, wherein the software application is optimized using one or more integration methods designed to ensure compatibility and enhance performance across diverse computing platforms; said techniques including, but not limited to, a modular software architecture for facile updates and enhancements to quantum algorithms, the integration of quantum and classical processors, the cross-environment functionality for seamless operation with various classical computing infrastructures, the implementation of real-time decryption and database-oriented structures, and the deployment of extensible APIs enabling robust data exchange and interoperation between quantum computing systems and traditional data analysis platforms, with the provisions for accommodating advancements in quantum computing, artificial intelligence and cryptographic protocols.

13. The method of claim 1, wherein the software application and its modules are configured for interoperability with existing data analysis platforms by supporting standard data interchange formats and protocols comprising JSON, XML, and ASN.1, and employing mechanisms to ensure compliance with data privacy and security regulations such as AES-256 encryption, zero-trust access control, post-quantum cryptographic resilience measures, and adherence to industry standards for secure cryptographic key handling, thereby ensuring compatibility with quantum and classical security frameworks.

14. The method of claim 1, wherein the software application enables real-time decryption and analysis of encrypted data, such as communications.

15. The method of claim 1, wherein the quantum computing module is configured to scale dynamically based on the volume of encrypted data being processed, supporting high-throughput decryption tasks consistent with real-time analysis of large-scale data streams, is enabled with configurability for existing and future cryptographic, data visualization, data analytics and programming systems, and supports standard data interface formats and protocols of such systems.

* * * * *